United States Patent

[11] 3,582,023

[72] Inventors William N. Rosta;
Russelle L. Maxwell, both of Fort Worth, Tex.
[21] Appl. No. 844,030
[22] Filed July 23, 1969
[45] Patented June 1, 1971
[73] Assignee The VLM Corporation
Fort Worth, Tex.

[54] PITCH CONTROL FOR ROTARY WING AIRCRAFT
14 Claims, 4 Drawing Figs.
[52] U.S. Cl. ..................................... 244/23, 244/17.11
[51] Int. Cl. ..................................... B64c 29/00
[50] Field of Search ........................... 244/23, 12, 17.11, 17.23, 17.19; 416/Inquired

[56] References Cited
UNITED STATES PATENTS

| | | | |
|---|---|---|---|
| 3,182,929 | 5/1965 | Lemberger | 244/23X |
| 3,437,290 | 4/1969 | Norman | 244/23 |
| 3,507,461 | 4/1970 | Rosta | 244/23X |

Primary Examiner—Milton Buchler
Assistant Examiner—Paul E. Sauberer
Attorney—Giles C. Clegg, Jr.

ABSTRACT: A rotary wing aircraft includes a central fuselage and a rotor consisting of an inner annular hub rotatably supported on and encircling the fuselage, radially extending radial blades and an outer supporting ring. The rotor is adapted to be driven by a turbine device associated with the rotor outer ring and an outer track nonrotatably attached to the fuselage. Each rotor blade is attached to a radially disposed, rotatable spindle in the hub structure; and pitch control arms are fixed to these spindles for controlling the rotation of the spindles and, therefore, the pitch of the attached rotor blades. An annular, pneumatically controlled bellows system, mounted on the fuselage concentric with the hub selectively controls the oscillation of the pitch control arms and thereby provides collective and cyclic pitch control for the rotor blades.

In a rotary wing aircraft, such as a helicopter, it is conventional to provide means for changing the pitch of the rotor blades for control of the aircraft. The changing of the pitch of each of the rotor blades simultaneously and uniformly is referred to as "collective pitch control," this control being used to increase or decrease the lift of the rotor. The variable changing of the pitch of a rotor blade in relation to its angular position relative to the aircraft fuselage is referred to as cyclic pitch control. This control is used, during forward motion of the aircraft, to compensate for the fact that the rotor blades moving in the direction of flight should have a different pitch than the retreating blades. This cyclic pitch control may also be used for directional control of the aircraft and for trimming of the aircraft. The use of a cyclic pitch control of a directional control is particularly important in aircraft which does not have any tail structure for directional and attitude control, as do conventional helicopters.

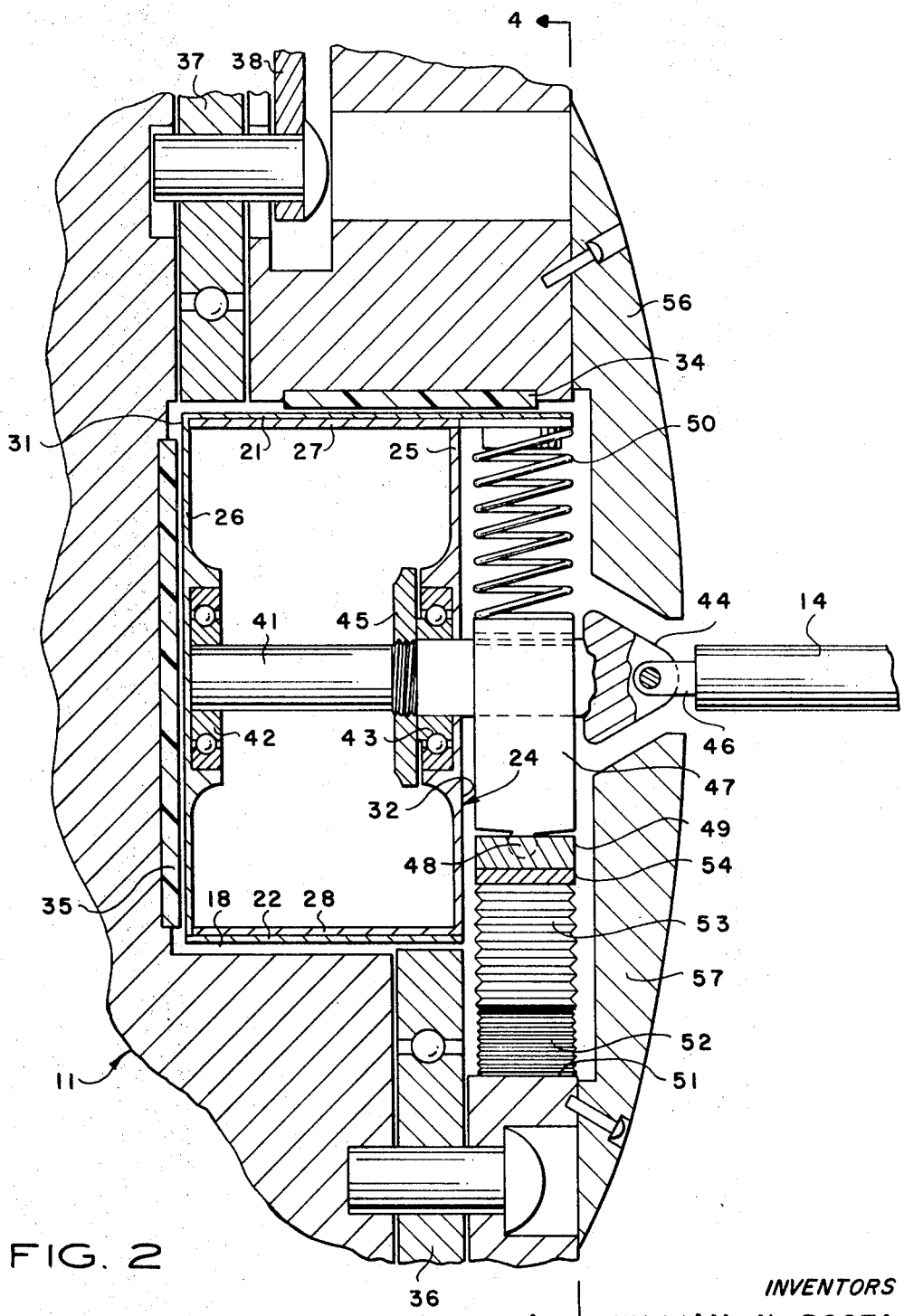

PITCH CONTROL FOR ROTARY WING AIRCRAFT

Accordingly, it is a principal object of this invention to provide an improved collective and cyclic pitch control for an aircraft having a rotor encircling a central fuselage.

Another object of this invention is to provide such collective and cyclic pitch control which is positive in operation and readily controllable by the pilot of the aircraft.

A further object of this invention is to provide an improved, independent collective and cyclic pitch control system wherein the cyclic pitch control system may be used as a backup collective pitch control system.

A still further object of this invention is to provide an improved positive acting collective and cyclic pitch control system, wherein the rotor blades will automatically seek the low pitch condition in the event of power failure.

These objects are accomplished in an aircraft having a central fuselage or a body and a rotor rotatably supported on and encircling said body, including an annular hub supporting radially extending rotor blades. The blades are secured to respective radially disposed rotating spindles in the hub, the rotation of each spindle being controlled by respective arms nonrotatably affixed to the spindles. An annular expansible device mounted on the fuselage, concentric with the hub, expands in a vertical direction to control oscillation of the spindle arms and, accordingly, the pitch of the attached rotor blades.

DRAWINGS

The novel features of the invention, as well as additional objects and advantages thereof, will be understood more fully from the following description when read in connection with the accompanying drawings in which:

FIG. 2 is a fragmentary sectional view taken in the radial plane illustrating details of the rotor hub, the rotor hub support, and the rotor blade support;

DESCRIPTION OF THE PREFERRED EMBODIMENT

Figure 1:
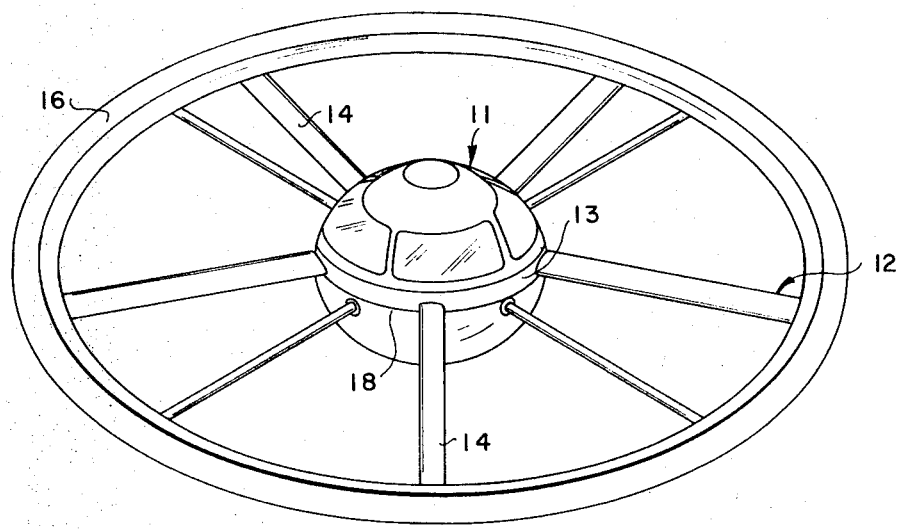
FIG. 1 is a perspective view of a rotary wing aircraft embodying the present invention.

FIG. 1 of the drawing is a perspective view showing the general features of a rotary wing aircraft with which the present invention may be used. The aircraft includes a fuselage or body 11 which is generally spherical in shape and which is provided with a generally horizontally disposed channel or track 18 about the outer periphery for rotatably supporting the rotor assembly 12. The rotor assembly includes an annular ring or hub 13 which is supported and confined within the body track, five radially extending and equally spaced rotor blades 14 which define airfoils in the manner of a helicopter, and an outer support ring 15 to which the outer ends of the rotor blades are attached. Suitable bearing means are provided between the fuselage track and the rotor hub, as will be described.

A rotor outer ring 15 is guided in a track defined by a nonrotatable outer ring 16 supported relative to the body 11 by four radial struts 17. Suitable bearing means are provided between the rotor outer ring 15 and the outer guide track 16. It is preferably, in aircraft of this type that the rotor structure be permitted to cone; and for this purpose the rotor blades 14 are hingedly connected at their inner ends to hub 13 and at their outer ends to the ring 15. Similarly, the struts 17 are hingedly connected at their inner ends to the body 11 and at their outer ends to the track ring 16.

The aircraft may be powered by a turbine system (not shown) consisting of turbine blades provided in the outer rotor ring 15 and turbine nozzles provided in the track ring 16. A source of compressed gas for the turbine may be provided within the fuselage 11, with the compressed gas being supplied to the turbine nozzles through conduits defined by the strut 17.

As suggested by the fuselage windows shown in FIG. 1, the upper portion of the spherical fuselage may enclose the cabin for the passengers and crew, while the lower portion may enclose compartments for the power and other equipment of the aircraft and for storage.

Figure 4:
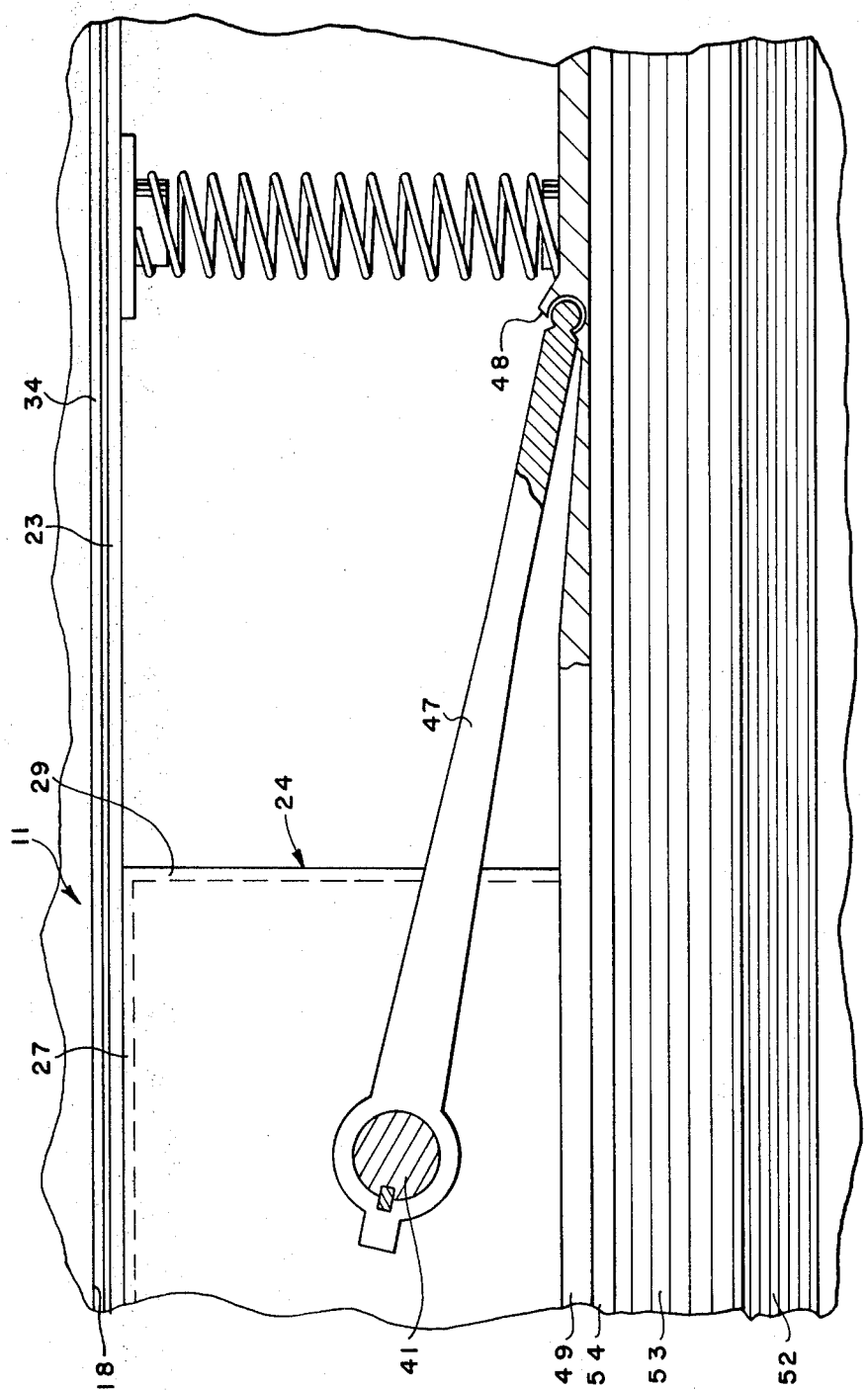
FIG. 4 is a fragmentary side elevation view of the aircraft (with the fairing removed) taken along the line 4-4 of FIG. 2.

FIG. 2 is a fragmentary sectional view taken in a radial plane with respect to the axis of rotation of the rotor, and illustrates the structure of the hub 13 in the area of one of the rotor blade mountings. As seen in this figure, the hub 13 is rectangular as viewed in transverse section. The hub, as a whole, may then be characterized as having a rectangular washer shape. The principal structural members of the hub are upper and lower flat washerlike plates 21 and 22 respectively, which define the upper and lower walls of the hub 13. The upper plate 21 extends radially outward beyond the principal hub structure to define a lip 23 for purposes to be described. Each of the rotor blades 14 is supported by a boxlike support structure or member 24 which, as seen in FIGS. 2 and 4, is made up of outer and inner walls 25 and 26 respectively, upper and lower walls 27 and 28 respectively, and end walls 29. The upper and lower walls 27 and 28 of these support structures are secured to the upper and lower hub of plates 21 and 22 in any suitable manner to define a unitary structure. The blade support structures 24 correspond of course to the number of rotor blades, and are peripherally spaced from each other. The intervening peripheral spaces may be occupied by laminated honeycomb elements fabricated from aluminum or fiber glass for example, to further make up the unitary hub assembly 13 and to provide strength and rigidity to the hub assembly. The overall structure of the hub 13 defines upper and lower planar surfaces defined by the walls 21 and 22 respectively, an inner cylindrical surface 31 defined by the support structure walls 26 and the walls of the intervening structure, and an outer generally cylindrical wall 32 defined by the outer wall 25 of the blade support structures and the walls of the intervening structure, with the lip 23 overhanging the outer cylindrical wall 32.

Also, as seen in FIG. 2, the channel or track 18 is provided in the housing 11 for receiving and supporting the rotor hub 13 which is generally rectangular in cross section. The bearing arrangement for supporting the fuselage on the rotor during flight includes upper air bearing pads 34 supported in suitable recesses in the upper channel wall and coacting with the upper surface of the hub plate 21. Similarly, inner air bearing pads 35 are supported in suitable recesses in the inner wall of the housing channel 18 to coact with the cylindrical surface 31 of the hub 13 and maintain the concentric separation between the fuselage and the hub. Air or other suitable pressurized gas is supplied (by means not shown) to maintain the necessary load bearing pressures within the air bearing spaces.

Since a lower bearing support for the hub 13 is normally operative only during rest or ground idling conditions or during gust conditions, a mechanical rather than an air bearing is preferably provided for this purpose. Such a bearing 36 is illustrated in the FIG. 2; and three or more such bearings may be suitably disposed around the periphery of the fuselage 11 to support the rotor hub 13 through engagement with the lower plate 22.

The upper air bearings 34 support the fuselage on the rotor during normal in flight operation. However, should there be a loss of air supply to these bearings, it is desirable to provide a backup mechanical bearing system. Accordingly, three or more roller bearings 37 are peripherally spaced about the fuselage 11 to be engaged with the upper hub of plate 21 when necessary. These bearings may be mounted on suitable arms 38 whereby the bearings may be moved vertically from a stored position, illustrated in FIG. 2, to an operative position wherein the outer race extends downwardly into the fuselage channel to engage the hub plate 21. Provisions may be made for automatic shifting of the backup bearings 37 to the operative position upon loss of air for the air bearings.

Figure 3:
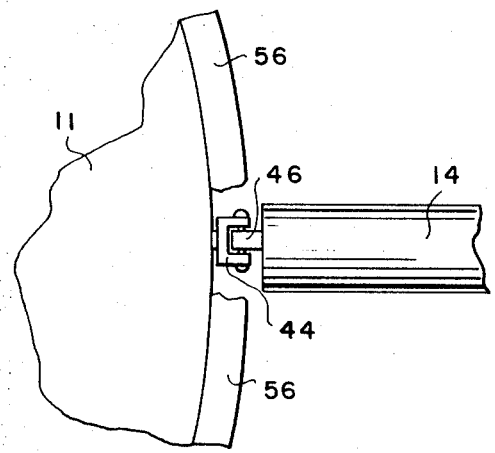
FIG. 3 is a fragmentary detail view of the rotor blade hinge.

Referring now to the blade mounting arrangement, a spindle 41 is rotatably supported in each of the support structures 24 by means of an inner bearing 42, mounted on the inner wall 26, and an outer thrust bearing 43, mounted on the outer wall 25. The spindle 41 extends through an opening in the outer wall 25 and terminates in a forked bracket 44 defining a clevis-type hinge element to which the inner end of the rotor blade 14 is attached. A thrust plate 45, threaded on the spindle 41, engages the thrust bearing 43 to transfer the centrifugal load to the hub 13. As seen in FIGS. 2 and 3, a spar member 46 of the rotor blade 14 is received within the forked bracket 44; and a suitable pin secured in aligned holes in the bracket 44 and spar 46 defines the hinge connection between the spindle 41 and the rotor blade 14 to permit coning of the rotor blade.

The above-described hinge connection is a nonrotatable connection with respect to the longitudinal axes of the spindle 41 and blade 14; and the rotation or pitch of the rotor blade 14 is controlled by a pitch control arm 47 nonrotatably secured to the spindle 41 by means of a suitable key. The pitch control arms 47 are disposed to lie generally horizontally adjacent to the outer wall 32 on the hub structure 13. The ends of the pitch control arms 47, which are remote from the spindles 41, are hingedly connected by means of ball and socket joint 48, for example, to an annular washerlike plate or shoe 49 which lies outside of the hub outer wall 32 and is disposed vertically beneath the lip 23. Vertical movement of the plate 49 then oscillates the pitch control arms 47 and rotates the rotor blades about their longitudinal axes to control the pitch thereof. The mechanism for controlling the vertical movement of the plate 49 will now be described.

The lower outboard perimeter of the rotor channel 18 in the fuselage 11 defines an annular recess defining a bottom wall 51 which underlies the lip 23 of the rotor hub. An annular air bellows 52 is supported on the wall 51; this bellows consisting of upper and lower relatively rigid walls, and the sidewalls thereof being defined by a bellows structure which provides for vertical expansion and contraction of the bellows in response to pressure changes therein. The bellows 52 is preferably in the form of a unitary annular structure, the structure being divided however by vertical walls or partitions to define four or more equal segmental chambers in which the pressure may be individually controlled. Assuming that the bellows 52 is divided into four equal segmental chambers, the partitions may be disposed in radial planes located 45° from the line of normal forward flight to define forward, rearward, left and right bellows chambers.

A second annular bellows 53 is mounted above the bellows 52, this bellows also including upper and lower relatively rigid walls and sidewalls defined by the bellows structure to provide for vertical expansion and contraction in response to changes in the air pressure therein. This bellows 53 provides either a continuous annular chamber, or chambers which are interconnected around the entire annulus, so that uniform pressure is maintained throughout the bellows.

A flat washerlike bearing plate 54 is secured to the upper wall of the bellows 53. The two bellows 52 and 53 and the bearing plate 54 define a nonrotating assembly mounted on the fuselage 11. The bearing plate 54 supports the pitch control plate 49, the pitch control plate being, of course, a part of the rotating hub assembly 13. The bearing plate 54 then coacts with the under surface of the pitch control plate 49 to define an air bearing to maintain separation of these members; and a supply of pressurized air is provided to this air bearing, either from the bellows 53 through suitable apertures provided in the upper wall and the bearing plate 54, or by other suitable means.

A plurality of compression springs 50 are positioned peripherally around the hub 13, acting between the upper hub plate lip 23 and the plate 49. These springs 50 continuously urge the pitch control plate 49 toward a lowermost position, and correspondingly urge the pitch control arms toward the clockwise rotational limit, is viewed in FIG. 4. The movement of the plate 49 by the springs 50 is opposed by the bellows 52 and 53.

The above-described fuselage channel 18, defining the track for the rotor hub and the recess for the components of the pitch control mechanism, is enclosed by upper and lower fairing members 56 and 57 which define therebetween a slot permitting movement of the rotor blades around the periphery of the fuselage.

OPERATION OF THE PREFERRED EMBODIMENT

The operation of the rotary wing aircraft and the pitch control will be briefly summarized. Compressed air from a suitable onboard source is directed to the air bearing pads 34 and 35, to provide the bearing separation between the fuselage 11 and rotor hub 13, and also to the bellows 52 and 53, with the bellows 53 preferably supplying air to the air bearing pad 54 between the bellows and the pitch control plate 49. The same air supply may provide air to a turbine drive device for the rotor consisting of coacting blades and nozzles in the rotor ring 15 and track ring 16 respectively. The two bellows 52 and 53 and the bearing pad 54 comprises a stationary assembly mounted on the housing for supporting and controlling the rotating portion of the pitch control assembly consisting of the pitch control plate 49 and pitch control arms 47 and the compression springs 50.

The compression springs 50 normally urge the pitch control plate 49 to its lower limiting position, the pitch control arms 47 being carried to a corresponding limiting position in which the rotor blade airfoils are positioned to produce the lowest angle of attack or pitch angle, which may be a negative angle $-4°$ for example. The force of the compression springs 50 is opposed by the two bellows 52 and 53 which are adapted to raise the pitch control plate 49 with corresponding rotation of the pitch control arms 47 to increase the pitch angle of the rotor blade airfoils. The maximum pitch angle may be $+14°$, for example, the pitch control mechanism therefore being adapted to control the pitch of each rotor blade through an angle of 18°.

The bellows 53 which defines a continuous annular chamber having a uniform pressure, is used for collective pitch control when it is desired to either increase or decrease the pitch of the rotor blades simultaneously to control the lift of the aircraft. The segmental bellows 52 is used for cyclic pitch control which effects variation in the pitch of a rotor blade as it progresses around the periphery of the fuselage. The supplying of pressurized air to the several segmental chambers of the cyclic pitch control bellows 52 at different pressures produces a predetermined inclination of the plane of the bearing plate 54 relative to the plane defined by the several spindles 41, which plane is of course normal to the axis of rotation of the rotor 12. The rotating pitch control plate 49 remains parallel to the bearing plate 54 at all times due to the air bearing coupling, this plate then wobbling as it rotates relative to the rotor axis to produce cyclic oscillation of the pitch control arms 47 and, therefore, cyclic changes in the pitch of the associated rotor blades 14.

With a pitch control mechanism as above described, the aircraft may be easily and readily controlled by the pilot through suitable air pressure regulating controls which effect an increase or decrease in the collective pitch control bellows 53 and which control the selective increase or decrease of the pressure in the several segmental chambers of the cyclic pitch control bellows 52. In the event that air supply to the collective pitch control bellows 53 should be lost for any reason, the controls may provide for uniform increase and decrease of the air pressure in the cyclic control bellows chambers to provide a backup collective pitch control system.

The pitch control system is designed for safety in that, should the air supply for the cyclic control bellows 52 and the collective control bellows 53 be lost, the compression springs 50 will urge the blades to the lower limiting pitch angle to permit a safe descent of the aircraft.

What has been described is an improved, simple and effective pitch control system for controlling both collective and cyclic pitch in a rotary wing aircraft.

What we claim is:

1. In a rotary wing aircraft having a central fuselage and a rotor assembly encircling said fuselage; said rotor assembly including an inner annular hub and a plurality of rotor blades supported by and extending radially from said annular hub; said fuselage having an annular channel defining a track for rotationally supporting the rotor hub; the improvement comprising;
a plurality of radially disposed spindles rotatably mounted in said rotor hub in angularly spaced relation; said spindles extending outwardly from said hub and each being provided with means for attachment to the inner end of a respective rotor blade;
thrust bearing means acting between each of said spindles and said hub to bear the longitudinal load produced by centrifugal force acting on said rotor blades;
crankarm means associated with each of said spindles for controlling the rotation thereof; shoe means associated with said arm means disposed to be acted on by a nonrotatable member associated with said fuselage;
a nonrotating expansible member mounted on said fuselage in a plane parallel to the plane of said rotor hub; said expansible member defining a surface which is movable relative to the plane of said rotor hub; and said expansible member movable surface being disposed to act on said shoe means associated with said spindle arms to effect rotation of said spindles in response to expansion and contraction of said annular expansible member.

2. A rotary wing aircraft as set forth in claim 1 wherein said expansible member acts when expanded to rotate said spindle arms in one direction; and spring means urging rotation of said arms in the opposite direction.

3. A rotary wing aircraft as set forth in claim 2 wherein said spring means urge rotation of said arms in a direction to decrease the pitch of said rotor blades; and wherein expansion of said expansible member rotates said arms in a direction to increase the pitch of said rotor blades.

4. A rotary wing aircraft as set forth in claim 1 wherein said spindle arm shoe means and said expansible member surface define confronting air bearing surfaces.

5. A rotary wing aircraft as set forth in claim 4 wherein said spindle arm shoe means comprises an annular ring defining a planar air bearing surface confronting the air bearing surface of said expansible member; means on the upper surface of said annular shoe means for pivotally connecting thereto each of said spindle arms, said spindle arms being rotated in response to vertical movement of said annular shoe means;

6. A rotary wing aircraft as set forth in claim 5 including spring means associated with said hub acting to urge said annular shoe means in a direction to effect contraction of said expansible member.

7. A rotary wing aircraft as set forth in claim 1 wherein said rotor assembly includes an outer ring connecting the outer ends of said rotor blades.

8. A rotary wing aircraft as set forth in claim 7 a nonrotatable outer ring mounted on said fuselage by means of radially extending strut members; said nonrotatable outer ring including means defining a guide track for said rotor ring.

9. A rotary wing aircraft as set forth in claim 1 wherein said annular expansible member comprises a continuous air bladder mounted on said fuselage concentric with said rotor hub; said air bladder expanding and contracting uniformly in response to changes in internal pressure whereby each of said spindle arms is rotated simultaneously through the same angle to effect collective pitch control of the rotor blades.

10. A rotary wing aircraft as set forth in claim 9 wherein said annular expansible member comprises a continuous annular air bellows disposed to expand and contract in a vertical direction.

11. A rotary wing aircraft as set forth in claim 1; wherein said annular expansible member comprises at least one air bladder defining a plurality of segmental compartments disposed on said fuselage in an annular arrangement concentric with said rotor hub; said segmental air bladder being adapted for nonuniform expansion and contraction to effect cyclic pitch control of the rotor blades.

12. A rotary wing aircraft as set forth in claim 11 wherein said air bladder segments consists of bellows-type bladders adapted for expansion and contraction in a vertical direction.

13. A rotary wing aircraft as set forth in claim 1 wherein said annular expansible member comprises a first continuous air bladder mounted on said housing concentric with said rotor hub, and the second air bladder defining a plurality of segmental compartments disposed on said fuselage in an annular arrangement concentric with said rotor hub; said first continuous air bladder expanding and contracting uniformly in response to changes and internal pressure whereby each of said spindle arms is rotated simultaneously through the same angle to effect collective pitch control of the rotor blades; and said segmental air bladder being adapted for nonuniform expansion and contraction to effect cyclic pitch control of the rotor blades.

14. A rotary wing aircraft as set forth in claim 1; wherein said spindle arms are secured to said spindles adjacent to the outer periphery of said rotor hub; wherein said annular expansible member is mounted on said housing outside of said rotor hub and concentric therewith;
the inner wall of said rotor hub defining a smooth, cylindrical surface; and air bearing means provided in the inner wall of said fuselage channel in confronting relation with said rotor hub cylindrical wall, for maintaining a radial separation of said rotor hub and said fuselage.